United States Patent
de la Rosa et al.

(10) Patent No.: US 12,110,143 B2
(45) Date of Patent: Oct. 8, 2024

(54) METHOD OF PACKING VARIETY PACKS OF BEVERAGES

(71) Applicant: Anheuser-Busch, LLC, St. Louis, MO (US)

(72) Inventors: Mark de la Rosa, Warners, NY (US); Rich Petrie, South Canastota, NY (US); Carl Grass, Ste. Genevieve, MO (US); Al Morgan, St. Louis, MO (US)

(73) Assignee: Anheuser-Busch, LLC, St. Louis, MO (US)

( * ) Notice: Subject to any disclaimer, the term of this patent is extended or adjusted under 35 U.S.C. 154(b) by 0 days.

(21) Appl. No.: 17/643,961

(22) Filed: Dec. 13, 2021

(65) Prior Publication Data
US 2022/0185520 A1 Jun. 16, 2022

Related U.S. Application Data

(60) Provisional application No. 63/126,232, filed on Dec. 16, 2020.

(51) Int. Cl.
| | |
|---|---|
| *B65B 35/30* | (2006.01) |
| *A23L 2/46* | (2006.01) |
| *A23L 2/56* | (2006.01) |
| *A23L 3/02* | (2006.01) |
| *B65B 27/04* | (2006.01) |
| *B65B 65/00* | (2006.01) |
| *B67C 3/22* | (2006.01) |
| *B67C 7/00* | (2006.01) |

(52) U.S. Cl.
CPC ............... *B65B 35/30* (2013.01); *A23L 2/46* (2013.01); *A23L 2/56* (2013.01); *A23L 3/02* (2013.01); *B65B 27/04* (2013.01); *B65B 65/006* (2013.01); *B67C 3/22* (2013.01); *B67C 7/00* (2013.01); *A23V 2002/00* (2013.01); *B65B 2220/14* (2013.01)

(58) Field of Classification Search
None
See application file for complete search history.

(56) References Cited

U.S. PATENT DOCUMENTS

| | | | |
|---|---|---|---|
| 6,326,032 B1 | 12/2001 | Richter et al. | |
| 6,425,226 B1 * | 7/2002 | Kirschner | B65G 1/1378 53/238 |

(Continued)

FOREIGN PATENT DOCUMENTS

DE 202005019906 U1 * 5/2007 ............. B65B 21/12

OTHER PUBLICATIONS

Econocorp Inc. Econocorp Beer E-2000 with Variety Pack Shelves. YouTube. May 27, 2020. [retrieved on Feb. 6, 2022]. Retrieved from internet: <URL: https://www.youtube.com/watch?v=YFk__IrNaIA>. entire video.

(Continued)

*Primary Examiner* — Tanzim Imam
(74) *Attorney, Agent, or Firm* — Husch Blackwell LLP

(57) ABSTRACT

The present invention allows a beverage manufacturer to package variety packs of beverages while it is filling various beverages. The improved system that carries out the method includes an onsite accumulator that eliminates the long-standing practice of packaging variety packs at a separate location from where the beverages are packed.

16 Claims, 9 Drawing Sheets

(56) References Cited

U.S. PATENT DOCUMENTS

| | | | |
|---|---|---|---|
| 7,743,587 B2* | 6/2010 | Hagenbrock | B65G 47/907 |
| | | | 53/445 |
| 10,343,805 B2 | 7/2019 | Woehl | |
| 2010/0000182 A1* | 1/2010 | Clusserath | B67C 7/002 |
| | | | 53/284.5 |
| 2017/0057675 A1* | 3/2017 | Woehl | B65B 65/006 |
| 2018/0170590 A1* | 6/2018 | Wojdyla | B65B 59/001 |
| 2020/0346394 A1* | 11/2020 | Poeschl | B29C 49/28 |
| 2022/0411249 A1* | 12/2022 | Till | B67C 3/007 |

OTHER PUBLICATIONS

Topshelf Productions LLC. Brewery 85 Showcase (2/4)—Canning Process. YouTube. Nov. 27, 2019. [retrieved on Feb. 6, 2022]. Retrieved from internet: <URL: https://www.youtube.com/watch?v=9uTAu61cbxc>. entire video.

Kansas City Star. The beer canning process at the Weston Brewing Co.. YouTube. Mar. 23, 2015. [retrieved on Feb. 6, 2022]. Retrieved from internet: <URL: https://www.youtube.com/watch?v=ywfb_th4kms>. entire video.

* cited by examiner

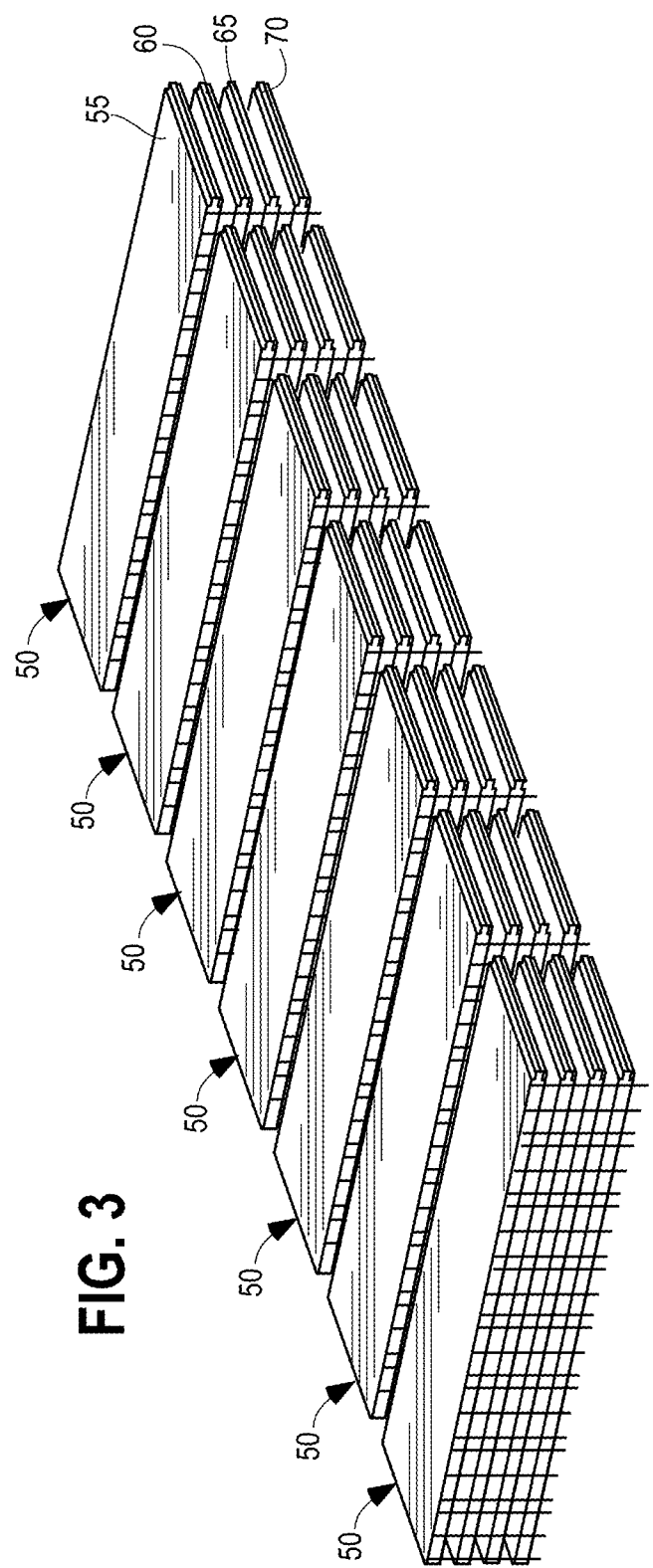

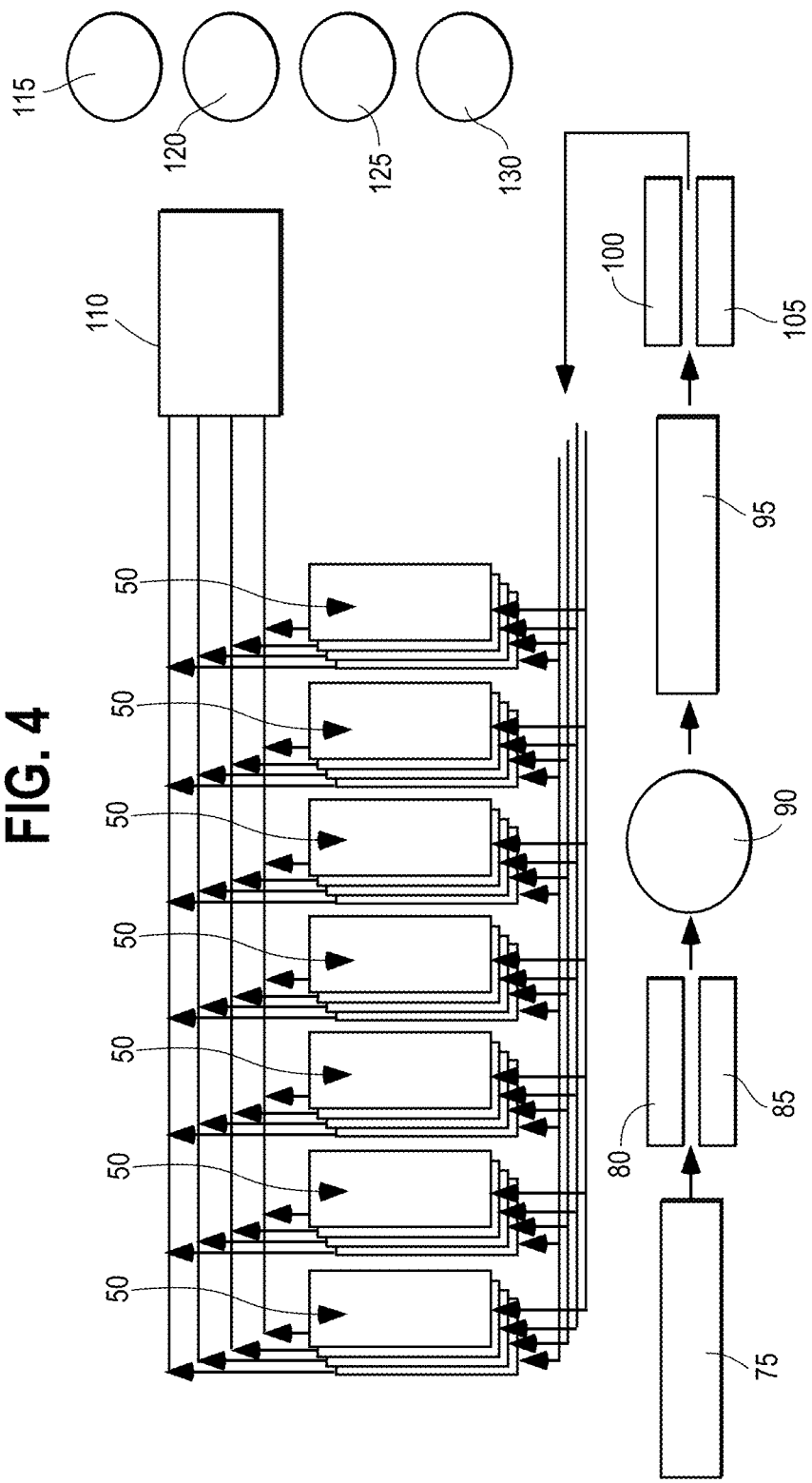

FIG. 5A

FLAVOR 1 ☐  FLAVOR 2 ▦  FLAVOR 3 ▨  FLAVOR 4 ▧

| 4 PACK CONFIGURATIONS: | 2x2 (4) | 2x2 |  |
|---|---|---|---|
| FLAVORS: | 1 | 2 | |
| ACCUMULATOR: | A | A \| B | |
| PACKER INFEED LANE: | 1 2 | 1 2 | |

| 6 PACK CONFIGURATIONS: | 2x3 (4) | 3x2 (1) | 2x3 |
|---|---|---|---|
| FLAVORS: | 1 | 2 | 3 |
| ACCUMULATOR: | A | A,B \| C,D | A \| B \| C |
| PACKER INFEED LANE: | 1 2 3 | 1 2 | 1 2 |

| 8 PACK CONFIGURATIONS: | 2x4 (4) | 4x2 (1) | 2x4 3 | 2x4 4 |
|---|---|---|---|---|
| FLAVORS: | 1 | 2 | 3 | 4 |
| ACCUMULATOR: | A | A,B \| C,D | A,B \| C \| D | A \| B \| C \| D |
| PACKER INFEED LANE: | 1 2 3 4 | 1 2 | 1 2 | 1 2 |

FIG. 5B

FLAVOR 1 ☐    FLAVOR 2 ▦    FLAVOR 3 ▧    FLAVOR 4 ▨

9 PACK CONFIGURATIONS: 3x3$^{(4)}$ — 3x3 — 3x3

12 PACK CONFIGURATIONS: 3x4$^{(4)}$ — 3x4 — 4x3$^{(1)(5)}$ — 3x4$^{(4)}$

12 PACK CONFIGURATIONS: 2x6$^{(4)}$ — 2x6 — 2x6 — 2x6$^{(2)}$

FIG. 5C

FLAVOR 1 □  FLAVOR 2 ▦  FLAVOR 3 ▨  FLAVOR 4 ▧

15 PACK CONFIGURATIONS:
- FLAVORS: 3×5⁽⁴⁾ / 1 — 3×5⁽²⁾ / 2 — 3×5⁽²⁾ / 3 — 3×5⁽²⁾ / 4
- ACCUMULATOR: A | A,B | A,B | C,D | A | B | C | D
- PACKER INFEED LANE: 1 2 3 4 5

18 PACK CONFIGURATIONS:
- FLAVORS: 3×6⁽⁴⁾ / 1 — 3×6 / 2 — 3×6 / 3 — 3×6⁽²⁾ / 4
- ACCUMULATOR: A | A,B | C,D | A | B | C | A | B | C | D
- PACKER INFEED LANE: 1 2 3 4 5 6

20 PACK CONFIGURATIONS:
- FLAVORS: 4×5⁽⁴⁾ / 1 — 4×5⁽²⁾ / 2 — 4×5⁽²⁾ / 3 — 4×5⁽²⁾ / 4
- ACCUMULATOR: A | A,B | C,D | A | B | C | A | B | C | D
- PACKER INFEED LANE: 1 2 3 4 5

FIG. 5D

METHOD OF PACKING VARIETY PACKS OF BEVERAGES

CROSS-REFERENCE TO RELATED APPLICATIONS

This Application claims priority to U.S. Provisional Patent Application Ser. No. 63/126,232, filed on Dec. 16, 2020, entitled "METHOD OF PACKING VARIETY PACKS OF BEVERAGES," currently pending, the entire disclosure of which is incorporated herein by reference.

FIELD OF THE INVENTION

The invention refers to beverage packaging. More specifically, this invention refers to a method for efficiently packaging variety packs of beverages having various flavors.

BACKGROUND OF THE INVENTION

Alcoholic beverages (like beer or spiked seltzer) and non-alcoholic beverages (like soda or juice) alike are often packaged and sold in variety packs in which multiple flavors or beverages are packaged and sold together. A consumer can thereby try multiple types of beverages without having to buy separate packages of each.

Variety packs are also useful for sharing when multiple consumers of a beverage pack have different flavor preferences. For example, if between a pair of individuals, one individual prefers a blueberry-flavored seltzer and the other a raspberry-flavored seltzer, the two individuals may purchase and share a variety pack with each flavor, rather than having to buy an entire pack of each flavor.

Beverage facilities do not currently have the footprint or equipment to package multiple flavors of beverages into a variety pack. As such, to manufacture variety packs of beverages, beverage companies currently package individual cases of a flavor before sending those individual flavor cases to a third party to unpack the individual flavor cases and re-pack them as variety packs. For example, in the instance where a variety pack will include three flavors: Flavor A, Flavor B, and C, the beverage company will package a case of Flavor A, a case of Flavor B, and a case of Flavor C. Those three cases will be sent to a separate location where the individual cases are unpackaged and re-packaged in variety packs that include all three flavors. This process is time and labor intensive.

Transporting variety packs to a second site only to unpackage what was just packaged is inefficient and wasteful. It also wastes packaging and is environmentally detrimental because the packs in which the beverages were sent to the second site are likely non-reusable. As such, a solution is desired that is efficient, does not require an additional site, and does not unnecessarily waste packaging.

SUMMARY OF THE INVENTION

The present invention uses one or more beverage fillers to fill and accumulate individual cans (or, in alternative embodiments, bottles) of a beverage. The filled beverage cans are staged in an improved accumulator that can store and organize filled beverage cans of multiple flavors that will subsequently be packed into variety packs.

A streamlined process uses either of a single- or multi-filler to efficiently fill variety packs of various combinations of beverages. The method described can be carried out in a single location and does not require a separate site to pack the variety beverage packs. The process may fill one flavor of beverage at or near the same time that it is packing the variety packs of beverages that include that same flavor.

BRIEF DESCRIPTION OF THE DRAWINGS

For a better understanding of the various embodiments of the present invention, reference may be made to the accompanying drawings in which:

FIG. 3 illustrates multiple second accumulator systems of FIG. 2;

FIG. 4 is an example flow chart for a filling and packing process;

Figure 5D:
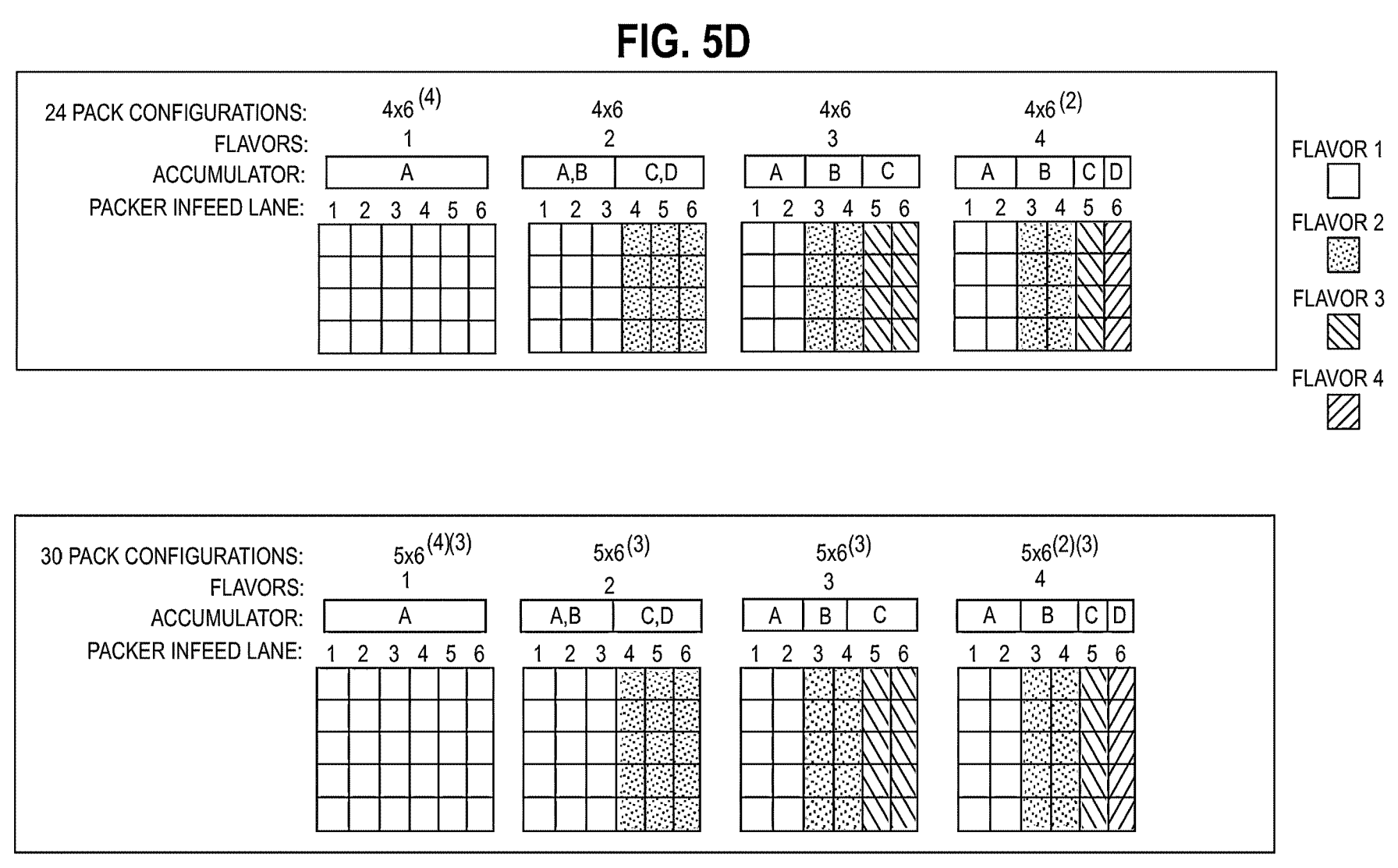

FIGS. 5A-5D illustrate various variety pack configurations that are achievable using the described systems and methods hereof;

Figure 1:
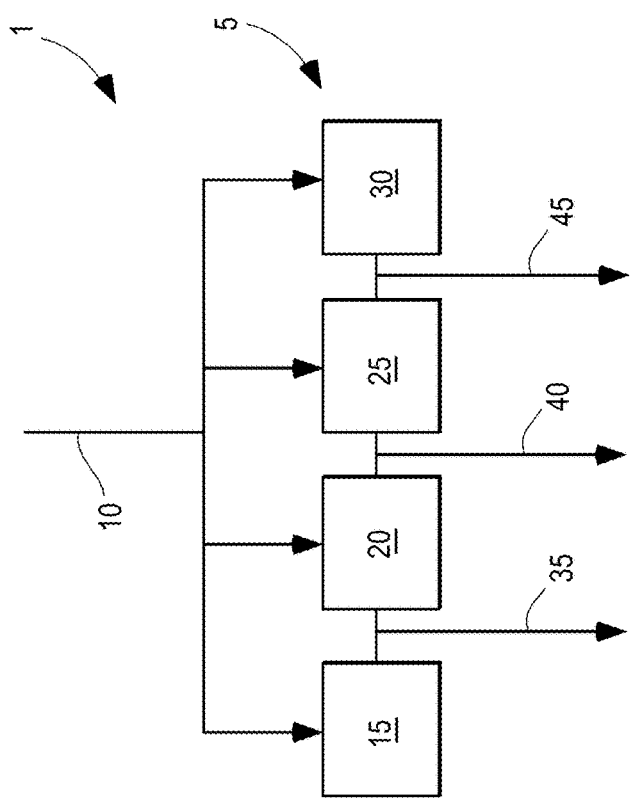
FIG. 1 illustrates a block diagram representing a first accumulator system constructed according to the teachings of the present invention.

While the disclosure is susceptible to various modifications and alternative forms, specific embodiments thereof are shown by way of example in the drawing and will herein be described in detail. It should be understood, however, that the drawings and detailed description presented herein are not intended to limit the disclosure to the particular embodiment disclosed, but on the contrary, the intention is to cover all modifications, equivalents, and alternatives falling within the spirit and scope of the present disclosure.

DETAILED DESCRIPTION OF THE INVENTION

The invention will now be described with reference to the drawing figures, in which like reference numerals refer to like parts throughout. For purposes of clarity in illustrating the characteristics of the present invention, proportional relationships of the elements have not necessarily been maintained in the drawing figures. It will be understood that any dimensions included in the figures are simply provided as examples and dimensions other than those provided therein are also within the scope of the invention.

The description of the invention references specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The present invention is defined by the appended claims and the description is, therefore, not to be taken in a limiting sense and shall not limit the scope of equivalents to which such claims are entitled.

Turning first to FIG. 1, a block diagram representing an example accumulator system 1 is illustrated. Known machinery may be used to fill cans (or bottles, in alternative embodiments) that are provided to an accumulation region 5 via a pathway 10. For a variety pack that will include four flavors, the accumulation region 5 may include four accumulation platforms 15, 20, 25, 30, each of which preferably correlates to a different beverage flavor. Different numbers of accumulation platforms may be used for different variety pack configurations, as desired. The platforms 15, 20, 25, 30 may each be formed as a storage section able to temporarily store a single beverage flavor until it is ready for packing the cans into a variety pack. The platforms 15, 20, 25, 30 may be spaced apart from one another and arranged in vertical stacks. The system 1 also preferably includes a plurality of packaging channels 35, 40, 45 to which beverages of various flavors from the platforms 15, 20, 25, 30 may be provided when ready for packaging. In alternative embodiments more or fewer channels such as the channels 35, 40, 45 may be provided.

Figure 2:
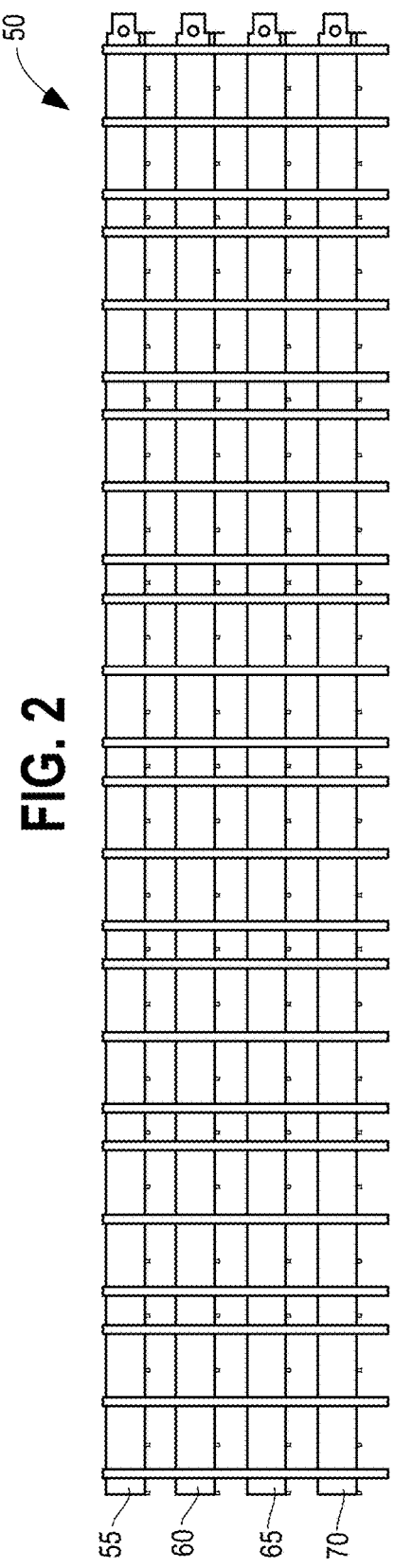
FIG. 2 illustrates a second accumulator system constructed according to the teachings of the present invention.

An alternatively constructed accumulator region 50 is illustrated in FIG. 2. The region 50 includes four platforms 55, 60, 65, 70 that are stacked on top of one another. Each platform 55, 60, 65, 70 preferably stores a different beverage flavor in a manner substantially similar to the platforms 15, 20, 25, 30. However, in alternative embodiments, various permutations and combinations of beverages may be provided on the platforms in either embodiment of the accumulator regions 5, 50.

FIG. 3 illustrates a plurality of accumulator regions 50 arranged side-by-side relative to one another. In operation, when an operator is ready to fill variety packs, the beverages may be removed from the regions 50 and their platforms 55, 60, 65, 70 in a number of ways to fill a package. Example methods are described below in greater detail.

FIG. 4 provides a schematic that illustrates a sample process for packaging a variety pack. Cans for a flavor may first be removed from a shipping pallet via a depalletizer 75. The cans may then be rinsed in one of more (in this case, two) rinser lanes 80, 85 before they are filled with a beverage flavor via a filler 90. The filler 90 may fill in two separate lanes (and thus two separate flavors), or it may fill a single flavor in a single lane. Other numbers of fillers 90 are also envisioned in alternatively constructed processes and systems. The filled cans may subsequently be pasteurized by a pasteurizer 95 before they are inspected in one of more (in this case, two) separate inspection lanes 100, 105. In the embodiment illustrated in FIG. 4, they are then sent to a plurality of accumulator regions 50 where they can be packed by a packer 110. Four filling tanks 115, 120, 125, 130 are illustrated that are preferably in communication with the filler 90 to fill the cans. The tanks 115, 120, 125, 130 may be pre-programmed or manually adjusted to fill various flavors at specific times to improve efficiency, as described below.

FIGS. 5A-5D provide various examples of variety pack configurations that are achievable using the improved system described herein. Each row in the provided charts gives various possible configurations for a given pack size (4, 6, 8, 9, 12, 15, 18, 20, 24, and 30-can packs) having up to four flavors (labeled as "Brands"). It also gives an example of which platforms (labeled as "Accumulator") may be utilized to achieve a given configuration efficiently. It further provides a packer infeed lane (in this embodiment, up to six infeed lanes) that may be used in the packaging process utilizing the packer 110. Finally, schematics of the variety packs as assembled are illustrated in each example row.

Figure 6:
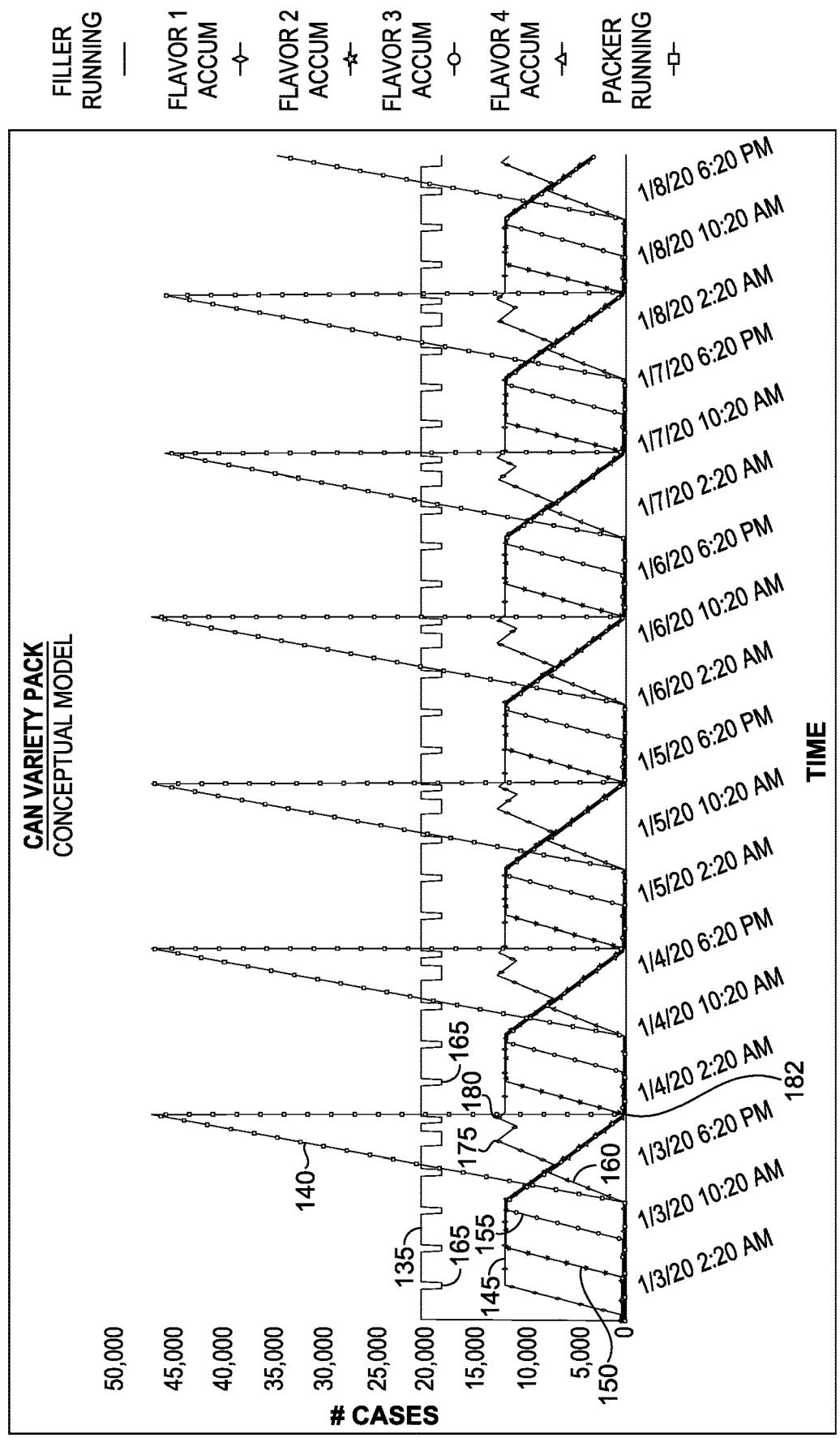
FIG. 6 is a schematic of a filling and accumulating model using a single filler.
Figure 7:
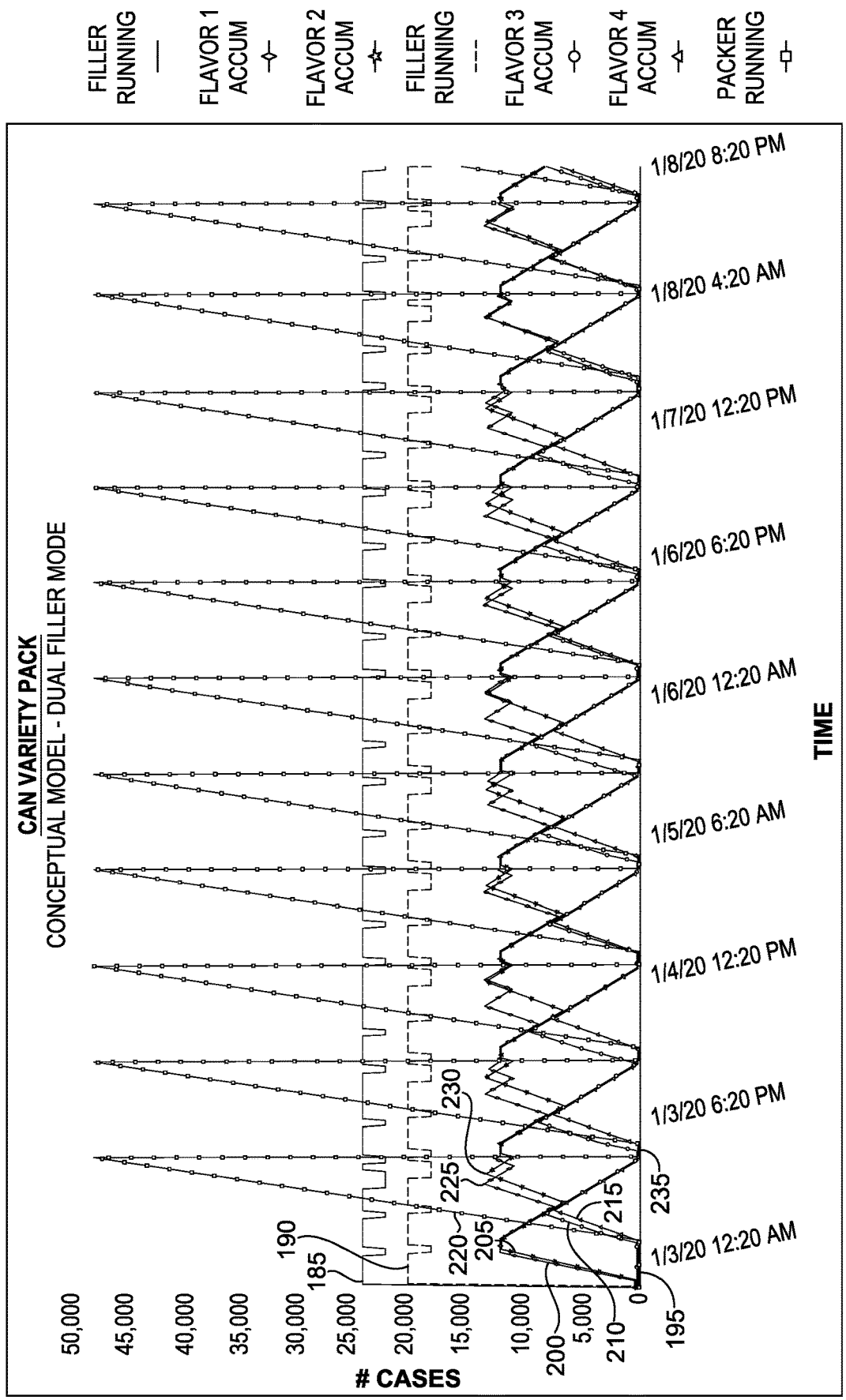
FIG. 7 is a schematic of a filling and accumulating model using a dual filler.

FIGS. 6 and 7 model filling and packing operations that efficiently make use of one and two filler lanes, respectively. In FIG. 6, in an instance where a single filler lane is utilized, a first line 135 illustrates operation of the filler 90, and a second line 140 illustrates operation of the packer 110. Four other lines 145, 150, 155, 160 represent accumulation of four different flavors, respectively. The filler 90 starts by filling the first flavor 145 which is illustrated as increasing in volume as it is filled and accumulates. In at least one example embodiment, and as shown in FIG. 6, the maximum storage capacity in an actual accumulation region for any one flavor is 11,700 cases, though this volume may change in alternative embodiments. Dips 165 in filling occur each time the filler 90 switches to a new flavor, such as when an accumulation region 50 is full.

Thus, as the first flavor 145 reaches a desired (or in some cases, maximum) inventory level, the filler 90 stops to change over to the second flavor 150, and then begins filling again. The second flavor 150 thus begins to accumulate until it reaches the desired inventory level. This repeats with the third flavor 155 until it reaches the desired volume as well. As the fourth flavor 160 begins being filled and accumulating, the packer 110 begins packing all four flavors 145, 150, 155, 160. The packer 110 in this embodiment does not wait for the fourth flavor 160 to fully accumulate, as the filler 90 can fill faster than the packer 110 can pack. As will be understood, this timing may change based on filling and packing capabilities. As such, the fourth flavor 160 inventory level rises more slowly, and ends at a lower level on the chart despite having a similar number of overall units filled. The packer 110 is therefore packing filled cans of the fourth flavor 160 nearly immediately after filling has begun for the fourth flavor 160.

After the fourth flavor 160 has achieved the desired number of filled units as discussed above with the other flavors, but well before the accumulated inventory of the four flavors 145, 150, 155, 160 have depleted from the accumulation regions 50, the filler 90 again begins filling the first flavor 145 to a new peak 175 higher than the previous desired total. This higher peak 175 may be due to the amount of inventory of the first flavor 145 that has left the accumulation region 50 and is en route to the packer 110. The total volume of the first flavor 145 in its accumulation region 50 may still be the above-discussed desired total.

As packing continues at the packer 110, the filler 90 pauses to allow the inventory of the first flavor 145 to drop again from its capacity. The filler 90 then begins filling the first flavor 145 again to restore it to capacity again at peak 180. As the packer 110 continues to package the four flavors 145, 150, 155, 160, the volume of the first flavor 145 drops back to the desired total (which again, as shown in FIG. 6, may be 11,700 cases). The packing operation may then pause at a point 182, having depleted the other three flavors 150, 155, 160. The goal is therefore to back fill the first flavor 145, leaving it in a general state of capacity once the packer 110 is finished and the remaining three flavors 150, 155, 160 are depleted. The inventory of remaining flavors may then begin to be refilled by the filler 90, and the packer 110 may start again when the fourth flavor 160 starts being refilled. The filling and packing operation may then repeat the above cycle as shown in FIG. 6.

It will also be understood that the spikes shown in line 140 representing the packer are for illustrative purposes only. The accumulation of variety packs does not drop back to zero between each packing session. Rather, this line 140 in FIG. 6 (and FIG. 7) is designed merely to show volume accumulated for each cycle. Showing the actual accumulation line—in which packing cycles each add to the total number of packaged cases, result in a chart scale that results in an unwieldly scale that inadequately illustrates other lines on the chart.

Continuing to FIG. 7, a filling and packing operation using two filler lanes is modeled using similar principals as those shown above. First and second lines 185, 190 illustrate dual operation of the fillers 90, and line 195 represents operation of the packer 110. Four other lines 200, 205, 210, 215 represent accumulation of four different flavors, respectively.

At the start of the illustrated process, the first and second flavors 200, 205 are filled by the fillers 90 operating via lines 185, 190 until a desired volume is filled. In the example embodiment provided in FIG. 7, this amount is 12,000 cases, though other amounts are foreseeable in alternative embodiments. At this time, the packer 110 is not in operation, as modeled by the line 195. Then, when the third and fourth flavors 210, 215 begin filling (and the flavors 200, 205 are no longer filling), packing increases very soon thereafter, as shown by a first increase 220 in the line 195. Before packing stops, the first and second flavors 200, 205 may experience a brief burst of filling as described above with respect to FIG. 7, modeled by peaks 225, 230, so that they are back filled into their accumulation regions 50 while packing nears a pause. Packing then briefly stops at a point 235 while filling of the third and fourth flavors 210, 215 increases to replenish a supply. The packing operation may then resume when enough of the third and fourth flavors 210, 215 are filled. The filling and packing cycle may then continue in its cycle where it replenishes the flavors as it fills and packs, as illustrated in FIG. 7. It should be noted that the fillers 90 are operating at separate rates in the example of FIG. 7 but may operate at the same or similar rates in alternative embodiments.

Thus, FIGS. 6 and 7 illustrate systems in which packing begins as the last flavor begins accumulating, and in which the first flavor is back filled in its accumulation region 50 as the packer is finishing the packing of all accumulated inventory of the other flavors.

From the foregoing, it will be seen that the various embodiments of the present invention are well adapted to attain all the objectives and advantages hereinabove set forth together with still other advantages which are obvious and which are inherent to the present structures. It will be understood that certain features and sub-combinations of the present embodiments are of utility and may be employed without reference to other features and sub-combinations. Since many possible embodiments of the present invention may be made without departing from the spirit and scope of the present invention, it is also to be understood that all disclosures herein set forth or illustrated in the accompanying drawings are to be interpreted as illustrative only and not limiting. The various constructions described above and illustrated in the drawings are presented by way of example only and are not intended to limit the concepts, principles and scope of the present invention.

Many changes, modifications, variations and other uses and applications of the present invention will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A system for packing variety packs of beverages, the system including:
   a first filler for filling at least one container with a first beverage flavor and at least one container with a second beverage flavor;
   a first accumulation zone for accumulating containers of the first beverage flavor;
   a first pathway connecting the first filler to the first accumulation zone and configured to transfer the at least one container filled with the first beverage flavor from the first filler to the first accumulation zone;
   a second accumulation zone for accumulating containers of the second beverage flavor;
   a second pathway connecting the first filler to the second accumulation zone and configured to transfer the at least one container filled with the second beverage flavor from the first filler to the second accumulation zone;
   a packer for packing a first plurality of containers of the first beverage flavor and a second plurality of containers of the second beverage flavor into at least one variety pack;
   a first channel for transferring the at least one container filled with the first beverage flavor from the first accumulation zone to the packer; and
   a second channel for transferring the at least one container filled with the second beverage flavor from the second accumulation zone to the packer;
   wherein the first accumulation zone is configured to hold a first number of containers, and the first filler is configured to fill the first number of containers with the first beverage flavor before filling a second number of containers with the second beverage flavor.

2. The system of claim 1, wherein the system further comprises a second filler for filling at least one container with the first beverage flavor and at least one container with the second beverage flavor.

3. The system of claim 1, wherein the system further comprises:
   a third accumulation zone for accumulating containers of a third beverage flavor; and
   a third channel for transferring at least one container of the third beverage flavor from the third accumulation zone to the packer; and
   wherein:
   the first filler is configured to fill at least one container with the third beverage flavor; and
   the packer is configured to pack the at least one variety pack with a third plurality of containers of the third beverage flavor.

4. The system of claim 3, wherein the system further comprises:
   a fourth accumulation zone for accumulating containers of a fourth beverage flavor; and
   a fourth channel for transferring at least one container of the fourth beverage flavor from the fourth accumulation zone to the packer; and
   wherein:
   the first filler or a second filler is configured to fill at least one container with the fourth beverage flavor; and
   the packer is configured to pack the at least one variety pack with a fourth plurality of containers of the fourth beverage flavor.

5. The system of claim 1, wherein the system further comprises a depalletizer for removing containers from a pallet prior to filling.

6. The system of claim 1, wherein the system further comprises a pasteurizer for pasteurizing containers after filling.

7. The system of claim 1, wherein the first accumulation zone and the second accumulation zone are arranged vertically with respect to each other.

8. The system of claim 7, wherein the first accumulation zone is one of a plurality of accumulation zones for containers of the first beverage flavor, each of the plurality of accumulation zones being connected to the first filler by one of a plurality of pathways configured to transfer containers of the first beverage flavor from the first filler to the accumulation zone, each of the plurality of accumulation zones being connected to the packer by a channel.

9. The system of claim 1, wherein the system is configured so that the first accumulation zone and the second accumulation zone begin to send containers to the packer when the first accumulation zone contains the first number of containers and the second accumulation zone contains the second number of containers.

10. The system of claim 4, wherein the first accumulation zone, the second accumulation zone, the third accumulation zone and the fourth accumulation zone are arranged vertically with respect to each other.

11. The system of claim 10, wherein the system is configured so that the first accumulation zone, the second accumulation zone, the third accumulation zone, and the fourth accumulation zone begin to send containers to the packer when the first accumulation zone contains a first number of containers, the second accumulation zone contains a second number of containers, the third accumulation zone contains a third number of containers, and the fourth accumulation zone contains a fourth number of containers.

12. A system for packing variety packs of beverages, the system comprising:
   a first filler for filling a first beverage flavor in a first plurality of cans and a second beverage flavor in a second plurality of cans;
   a first accumulation zone for accumulating the first plurality of cans;
   a second accumulation zone for accumulating the second plurality of cans; and
   a packer for packing the first plurality of cans and the second plurality of cans;
   wherein the system further comprises:
      a second filler for filling a third beverage flavor in a third plurality of cans and a fourth beverage flavor in a fourth plurality of cans; and
      a third accumulation zone for accumulating the third plurality of cans.

13. The system of claim 12, wherein the system further comprises a fourth accumulation zone for accumulating the fourth plurality of cans.

14. The system of claim 12, wherein the system further comprises a depalletizer for removing at least one of the first plurality of cans and the second plurality of cans from a pallet prior to filling.

15. The system of claim 12, wherein the system further comprises a pasteurizer for pasteurizing at least one of the first plurality of cans and the second plurality of cans after filling.

16. A system for packing variety packs of beverages, the system including:
   a first filler for filling at least one container with a first beverage flavor and at least one container with a second beverage flavor;
   a first accumulation zone for accumulating containers of the first beverage flavor;
   a first pathway connecting the first filler to the first accumulation zone and configured to transfer the at least one container filled with the first beverage flavor from the first filler to the first accumulation zone;
   a second accumulation zone for accumulating containers of the second beverage flavor;
   a second pathway connecting the first filler to the second accumulation zone and configured to transfer the at least one container filled with the second beverage flavor from the first filler to the second accumulation zone;
   a packer for packing a first plurality of containers of the first beverage flavor and a second plurality of containers filled with the second beverage flavor into at least one variety pack;
   a first channel for transferring the at least one container filled with the first beverage flavor from the first accumulation zone to the packer;
   a second channel for transferring the at least one container filled with the second beverage flavor from the second accumulation zone to the packer;
   a third accumulation zone for accumulating containers of a third beverage flavor;
   a third channel for transferring at least one container of the third beverage flavor from the third accumulation zone to the packer;
   a fourth accumulation zone for accumulating containers of a fourth beverage flavor; and
   a fourth channel for transferring at least one container of the fourth beverage flavor from the fourth accumulation zone to the packer;
   wherein:
      the first filler is configured to fill at least one container with the third beverage flavor,
      the first filler or a second filler is configured to fill at least one container with the fourth beverage flavor,
      the packer is configured to pack the at least one variety pack with a third plurality of containers of the third beverage flavor,
      the packer is configured to pack the at least one variety pack with a fourth plurality of containers of the fourth beverage flavor,
      the first accumulation zone is configured to hold a first number of containers,
      the second accumulation zone is configured to hold a second number of containers,
      the third accumulation zone is configured to hold a third number of containers, and
      the first filler is configured to:
         fill the first number of containers with the first beverage flavor before filling the second number of containers with the second beverage flavor;
         fill the second number of containers with the second beverage flavor before filling the third number of containers with the third beverage flavor; and
         fill the third number of containers with the third beverage flavor before filling a fourth number of containers with the fourth beverage flavor.

* * * * *